S. Macferran,
Door-Key Fastener.

Nº 56,071.            Patented July 3, 1866.

Witnesses                                   Inventor
                                            Samuel Macferran
                                            By his attorney
                                            Stephen Ustick

UNITED STATES PATENT OFFICE.

SAMUEL MACFERRAN, OF PHILADELPHIA, PENNSYLVANIA.

IMPROVED DOOR-KEY FASTENER.

Specification forming part of Letters Patent No. 56,071, dated July 3, 1866.

*To all whom it may concern:*

Be it known that I, SAMUEL MACFERRAN, of the city and county of Philadelphia, and State of Pennsylvania, have invented a new and Improved Door-Key Safety-Fastener; and I do hereby declare that the following is a full, clear, and exact description of the construction and operation of the same, reference being had to the annexed drawings, making a part of this specification, in which—

Figure 1:
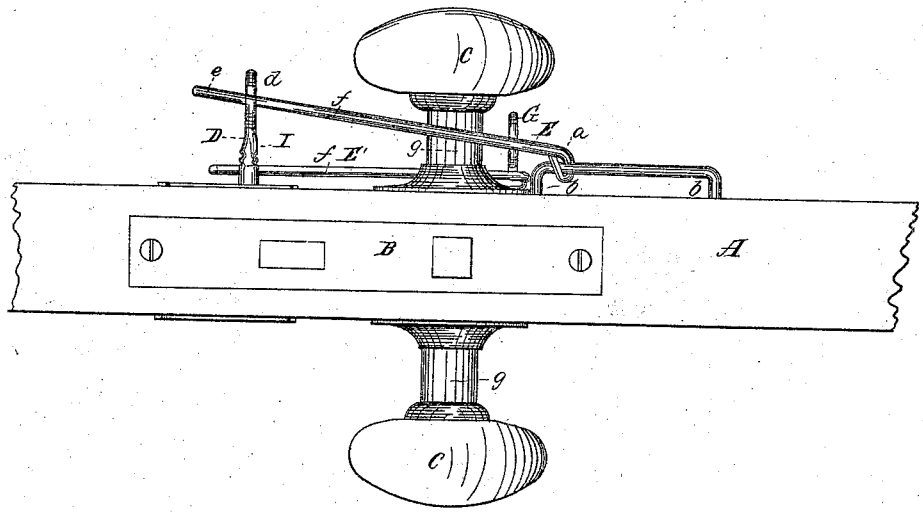
Figure 2:
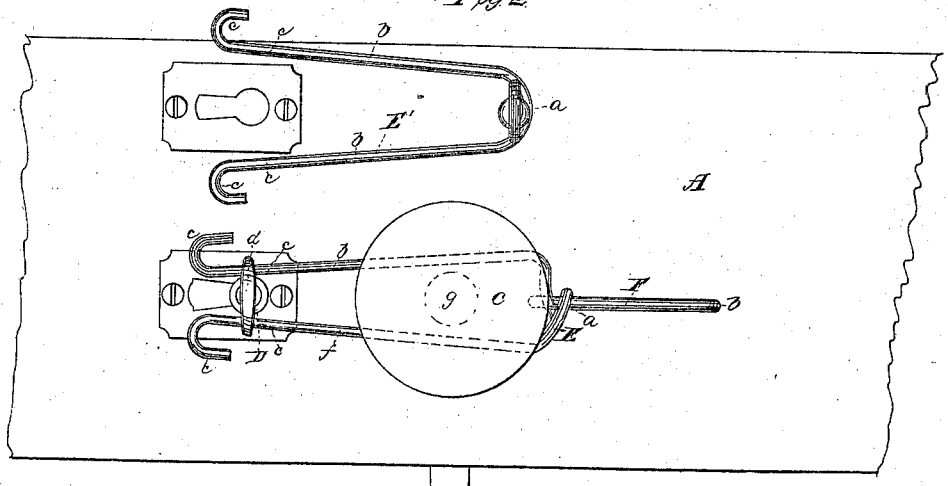

Figure 1 is an edge view of a portion of the front stile of a door with a lock and the improved fastening in connection therewith. Fig. 2 is a face view of the same.

Like letters in both figures indicate the same parts.

The nature of my invention consists, in the first place, of a bent-wire fastener which has a permanent connection with the inside of the door, and, in the second place, of a portable fastener, which is designed chiefly for travelers.

To enable others skilled in the art to which my improvement appertains to make and use my invention, I will proceed to describe its construction and operation.

In the drawings, A represents a portion of the front stile of a door. B is an ordinary lock, and C C the knobs. D is the key. E is a bent-wire fastener, which has a double turn at the point 1 to form the eye $a$, that has an easy fit on the slide F, whose prongs $b\ b$ are firmly secured in the stile A, so that the said eye may be moved thereon to change the altitudinal position of the fastener, whose ends $c\ c$ are placed in the bow $d$ of the key D, to prevent the latter being turned from the outside of the door. The fastener is shown in this position in both figures.

There are hooks, $e\ e$ on the prongs $f\ f$ of the fastener, which prevent the possibility of its removal from the outside of the door, as would be an easy matter for a burglar if the prongs were made without the hooks.

The object of the slide F is to secure the fastener E to the door to prevent it being carried off by children or evil-disposed persons; but the fastener may be used without it, being held in place by the stem $g$ of the knob C.

The operation is as follows: When the fastener is not wanted in connection with the key, the hooks $e\ e$ are slipped out of the bow of the key and they spread apart so as to be entirely free from the same, the slide F, on which the eye $a$ fits, holding the fastener in place. Or, if said slide is not in connection with the door, the fastener rests on the stem $g$ of the knob C. When the fastener is to be applied the ends of the prongs $f\ f$ are pushed through the bow $d$ of the key, the hooks $e\ e$ springing outward, as represented in Fig. 2, so as to prevent the possibility of disengaging the fastener from the outside of the door.

The arrangement of the bent wire E' shows a modification of the fastener, and is intended chiefly for the use of travelers, and to be carried in the pocket or trunk, and hence I make it flat, or nearly so, to take up but little room, as seen in Fig. 1. It may be held in place by the stem of the knob; but when there is no knob on the door I provide the thumb-screw G, the shank part of which passes through the eye $a$ of the fastener and is screwed into the door, as represented in the drawings. The hooks $e\ e$ are placed in the bow of the key in like manner as those of the fastener E, as above explained, and then the thumb-screw is screwed into the door. The screw has to be removed to unfasten the key.

Having thus fully described my improved door-key safety-fastener, what I claim therein as new, and desire to secure by Letters Patent, is—

1. Constructing the fastener E with the hooks $e\ e$, substantially in the manner hereinbefore described, and for the purpose specified.

2. The combination of the fastener E with the slide F by means of the eye $a$ of the former, substantially as described, and for the purpose specified.

In testimony that the above is my invention I have hereunto set my hand and affixed my seal this 3d day of March, 1866.

SAMUEL MACFERRAN. [L. S.]

Witnesses:
STEPHEN USTICK,
WILLIAMS OGLE.